United States Patent [19]

Chien et al.

[11] Patent Number: 5,412,296

[45] Date of Patent: May 2, 1995

[54] COMPUTER-AIDED SELF-LEARNING INTERMITTENT WINDSHIELD WIPER CONTROLLER

[76] Inventors: Ming-Hsien Chien; Chich-Chin Huang, both of No. 7-3, Lane 425, SEC. 1, Chieh Shou Rd., Paite Hsiang, Taoyuan Hsien, Taiwan, Prov. of China

[21] Appl. No.: 962,824

[22] Filed: Oct. 19, 1992

[51] Int. Cl.⁶ .................................. B60S 1/08
[52] U.S. Cl. .................. 318/444; 318/DIG. 2; 15/250.13
[58] Field of Search .......... 318/443, 444, DIG. 2, 318/445, 446, 484; 15/250.12, 250.13, 250.16, 250.17

[56] References Cited

U.S. PATENT DOCUMENTS

| | | | |
|---|---|---|---|
| 4,091,317 | 5/1978 | Roszyk et al. | 318/369 |
| 4,329,631 | 5/1982 | Betsch et al. | 318/466 |
| 4,375,610 | 3/1983 | Nagaoka et al. | 318/444 |
| 4,388,574 | 6/1983 | Bois et al. | 318/443 |
| 4,492,904 | 1/1985 | Graham | 318/444 |
| 4,733,142 | 3/1988 | Bicknell | 318/283 |
| 5,254,916 | 10/1993 | Hopkins | 318/443 |

*Primary Examiner*—Bentsu Ro

[57] ABSTRACT

A computer-aided self-learning intermittent windshield wiper controller is characterized that the time interval between the first sweeping cycle initiated by the switch of the wiper and the second sweeping cycle will be memorized and set as the time interval of following intermittent sweeping cycles. When the rain becomes heavier or slighter, the driver may intuitively turn the switch and further causing the microcomputer-controlled processing circuit to memorize the new time interval between the last sweeping cycle and the previous sweeping cycle. This new time interval shall then be set for following intermittent sweeping cycles.

1 Claim, 5 Drawing Sheets

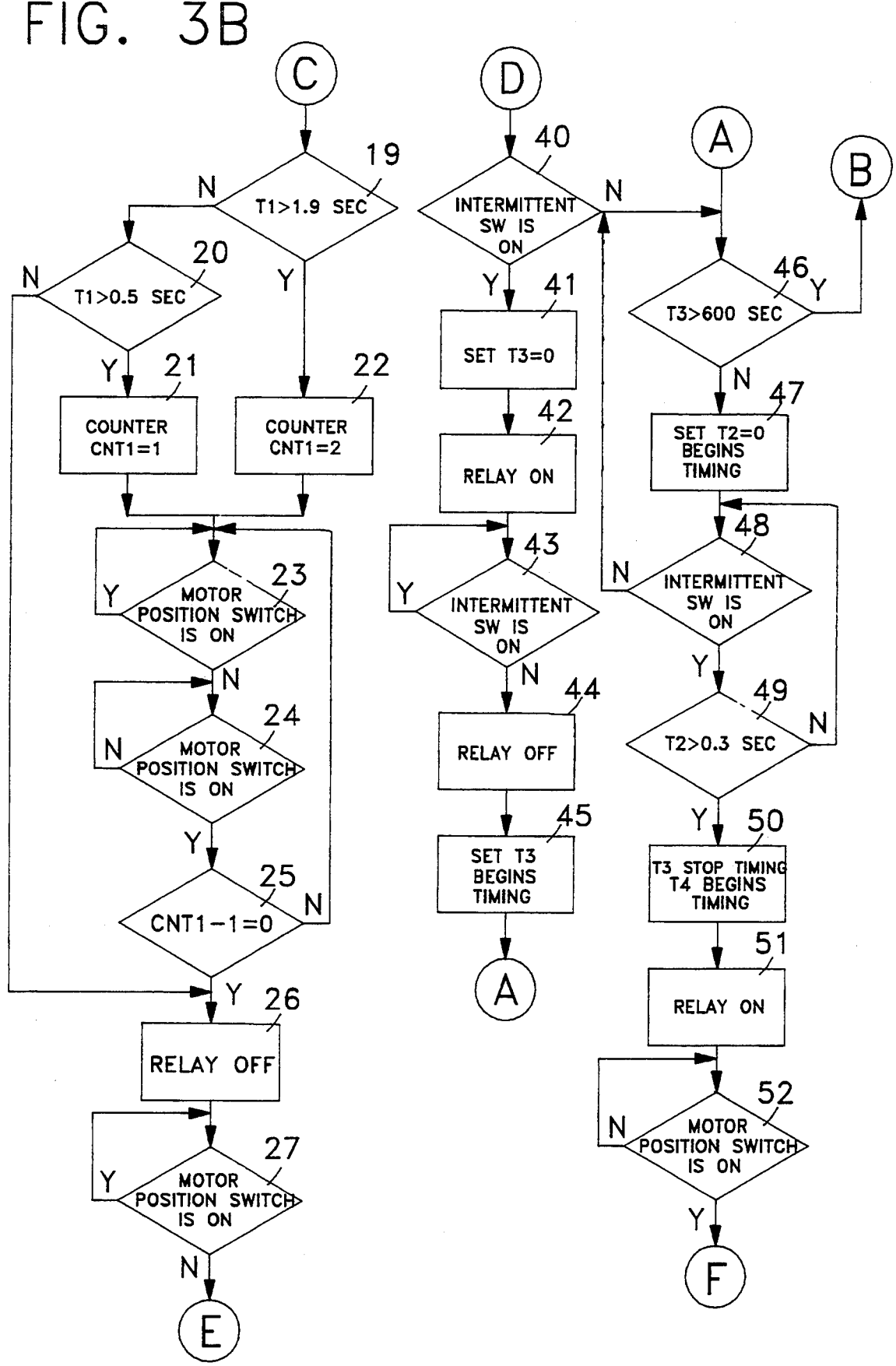

COMPUTER-AIDED SELF-LEARNING INTERMITTENT WINDSHIELD WIPER CONTROLLER

BACKGROUND OF THE INVENTION

The present invention relates to an intermittent windshield wiper controller, more particularly to a computer-aided self-learning intermittent windshield wiper controller.

According to a statistical report, the growth rate of the number of cars in this country has been increasing in recent years, partly contributing to the increased traffic accidents on a large scale. However, driving in the rain is a major reason why there were so many traffic accidents. The dim vision associated with raining keeps drivers in a dangerous situation that drivers have to concentrate on driving without any oversights.

In order to help drivers to drive in a better condition in the rain, a good wiper with some specific functions plays the most important role in improving the visibility.

As a matter of fact, the structures and functions of commercially available wipers are essentially the same without any special features. Although there might be some minor differences, e.g., modifications in the sweeping operation of intermittent mode, they won't depart from either one of the following two patterns.

1. The intermittent sweeping operations of the wipers equipped in most cars work in a same manner. Briefly to say, the wipers sweep at intervals of a predetermined constant time period which can not be varied with the rainfalls. (Shown in FIG. 1)

2. The adjustability as claimed in some other commercial wipers are achieved by a fine tuner. A driver who is driving in the rain has to adjust the fine tuner manually according to the raining condition observed. Consequently, he must try many times of adjustment to obtain an optimal sweeping interval. However, the rainfall will have changed at the time the driver obtains an appropriate sweeping interval which is obtained according to the previous condition of rains.

In view of above disadvantages of conventional wipers, the inventor has invented a practical, easy-handling, and highly reliable computer-aided self-learning intermittent windshield wiper controller after a series of analyses and experiments taking every possible condition into consideration. According to the present invention, the computer will "learn" and thereby "know" when to instruct the wiper to sweep intermittently at intervals of recorded time, and to adjust the time interval of the wiper according to the degree of heaviness of the rain. (Shown in FIG. 2) The time interval between sweeping cycles will be shortened when the rain becomes heavier and the sweeping will speed up. Similarly, when the rain becomes lighter, the interval will be lengthened and the sweeping will slow down. With the aid of such a wiper, better visibility can be ensured so as to keep the driver in a much safer condition when driving in the rain.

For better understanding the features and techniques of the present invention, please refer to the detailed specification and annexed drawings which are used only for reference and not intended to limit the scope of the present invention.

BRIEF DESCRIPTION OF THE DRAWINGS

FIG. 3A-3C are flow charts of a wiper according to the present invention; and

DETAILED DESCRIPTION OF THE PREFERRED EMBODIMENT

Figure 1:
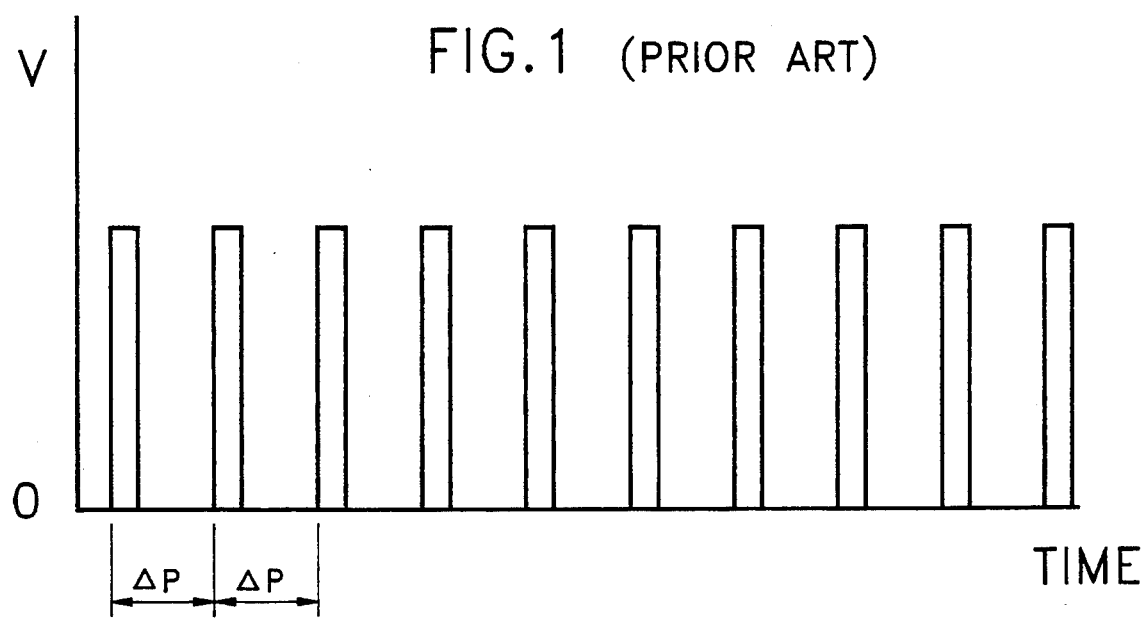
FIG. 1 illustrates the time sequence of the operation of a conventional intermittent wiper.

FIG. 1 shows the time sequence of the operation of a conventional wiper. The conventional wiper, in spite of being adjustable or not, sweeps intermittently at constant-time interval, p.

Figure 2:
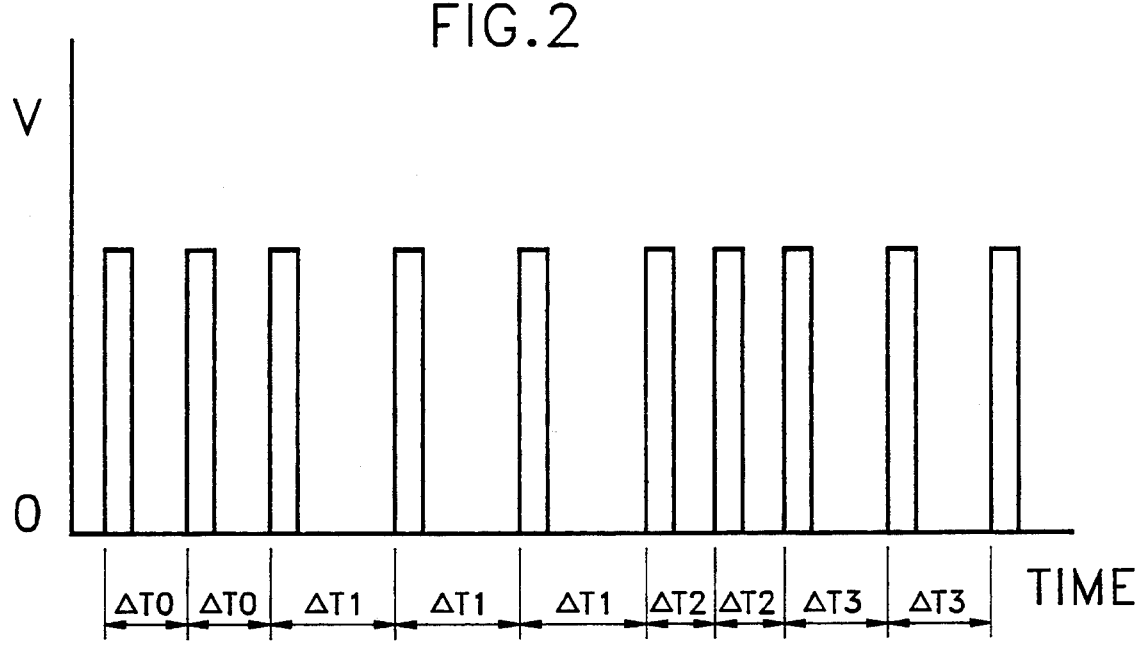
FIG. 2 illustrates the time sequence of the operation of a computer-aided self-learning intermittent windshield wiper according to the present invention.
Figure 4:
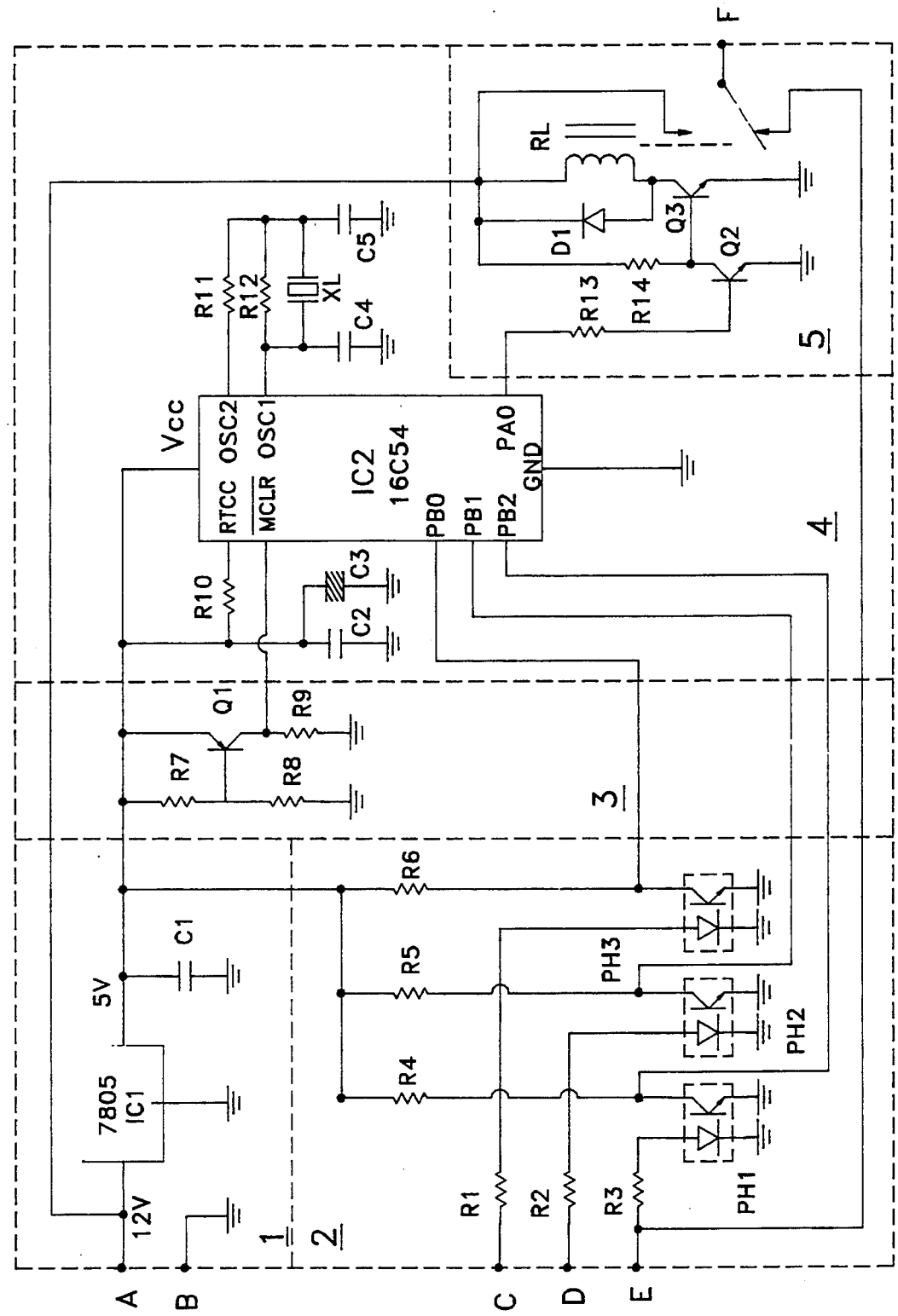
FIG. 4 is a block diagram of the control circuit of a wiper according to the present invention.

Please refer to FIG. 2 illustrating the time sequence of sweeping of the wiper, and FIG. 4 showing a block diagram of the control circuit of the present invention, in which the input port contains:

1. a motor position signal switch (PB2) which can detect the position of the wiper and sweep for one cycle.

2. a water jet switch (PB1) which, when in use, will inject water a second before the wiper starts sweeping. If this switch is kept depressed, the wiper will sweep continuously with water kept flowing till this switch is released. When this switch is released, the wiper will sweep two cycle and stop for 4.8 seconds to allow all water drops on the windshield to flow down, followed by a final sweeping cycle.

3. an intermittent switch (PB0), which is the most representative and innovative part of the present invention. It is the essence of an unprecendented "self-learning intermittent wiper" according to the present invention by provision of the following functions:

(a) Whenever vision becomes dim because of rainfall accumulated on the windshield, a pushing on this switch to the intermittent mode and turning back thereafter will start the wiper to sweep for one cycle. When the vision becomes dim again, turning the switch to the intermittent mode, the wiper will sweep for another cycle. The interval between the former sweeping and the latter sweeping will be memorized, and the wiper will repeat sweeping at such a memorized interval continuously.

(b) The above interval can be adjusted from time to time to extend or shorten the length of interval upon change of raining condition.

i. When the rainfall becomes heavier and dims the vision at the time the wiper is sweeping intermittently, the interval can be adjusted by turning off the wiper and then, switching it back to the intermittent mode to let the wiper to sweep at a shorter interval which is obtained from the driver's intuitive adjustment according to the rains.

ii. When rainfall slows down, the sweeping needs to slow down so as to eliminate noise and friction between the wiper and the windshield. The interval can be adjusted by turning off the wiper and then when the vision is about to be dimmed, switching it back to the intermittent mode causing the wiper to sweep at a longer interval.

The interval T0 between the first sweeping and the second sweeping initiated by turning the switch to the intermittent mode and turning the switch to the "off"

position followed by turning the switch again to the intermittent mode is memorized and set as the interval of following intermittent sweepings. Upon change of the raining condition, a new interval T1 can be memorized and set by turning off the wiper and then, switching it back to the intermittent mode according to the driver's intuition. T1 is the time between the last sweeping and the previous sweeping initiated by the switching to the intermittent mode. Sweeping at the interval TI will continue till the switch is turned off.

Figure 3A:
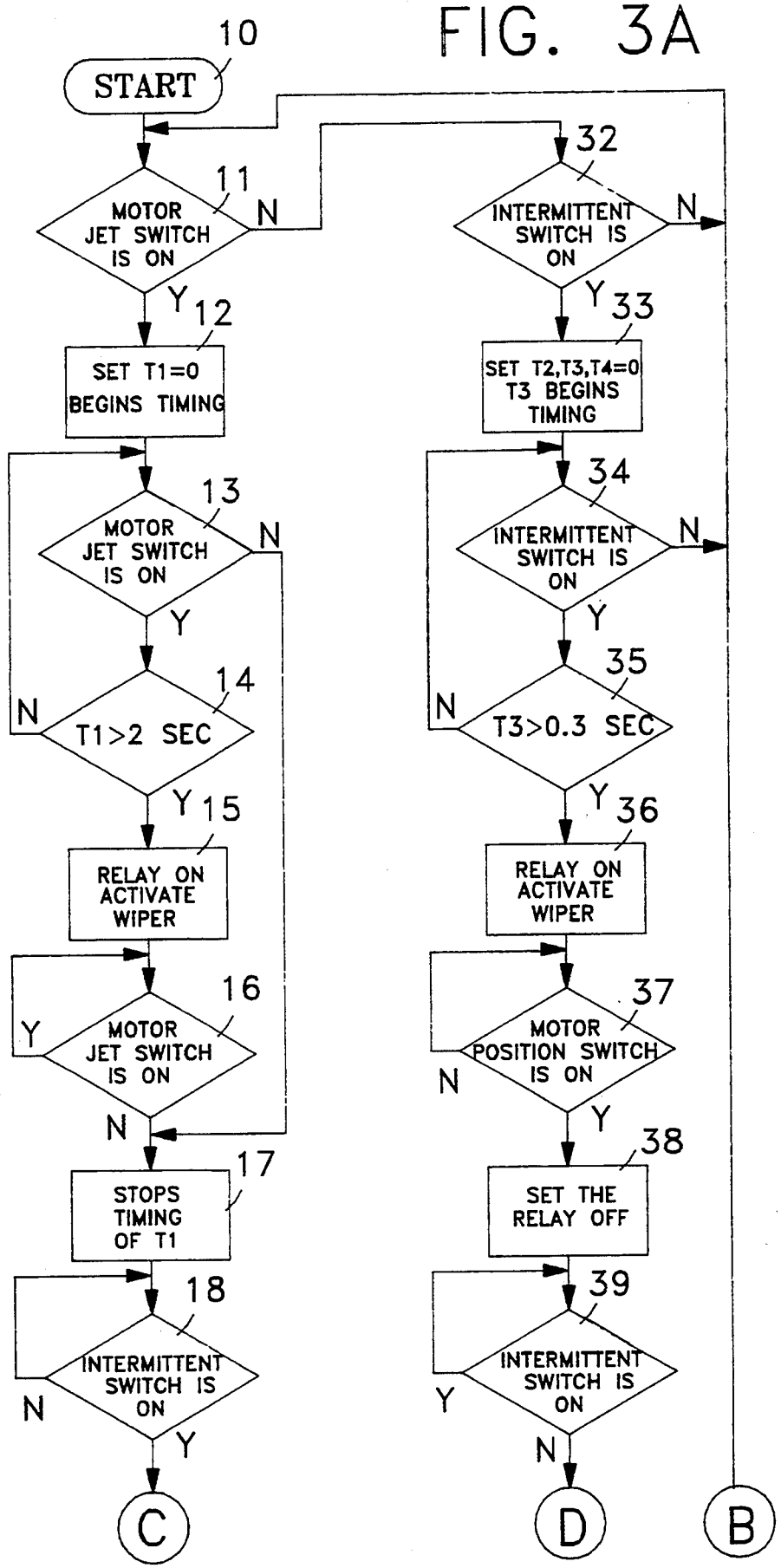
Figure 3C:
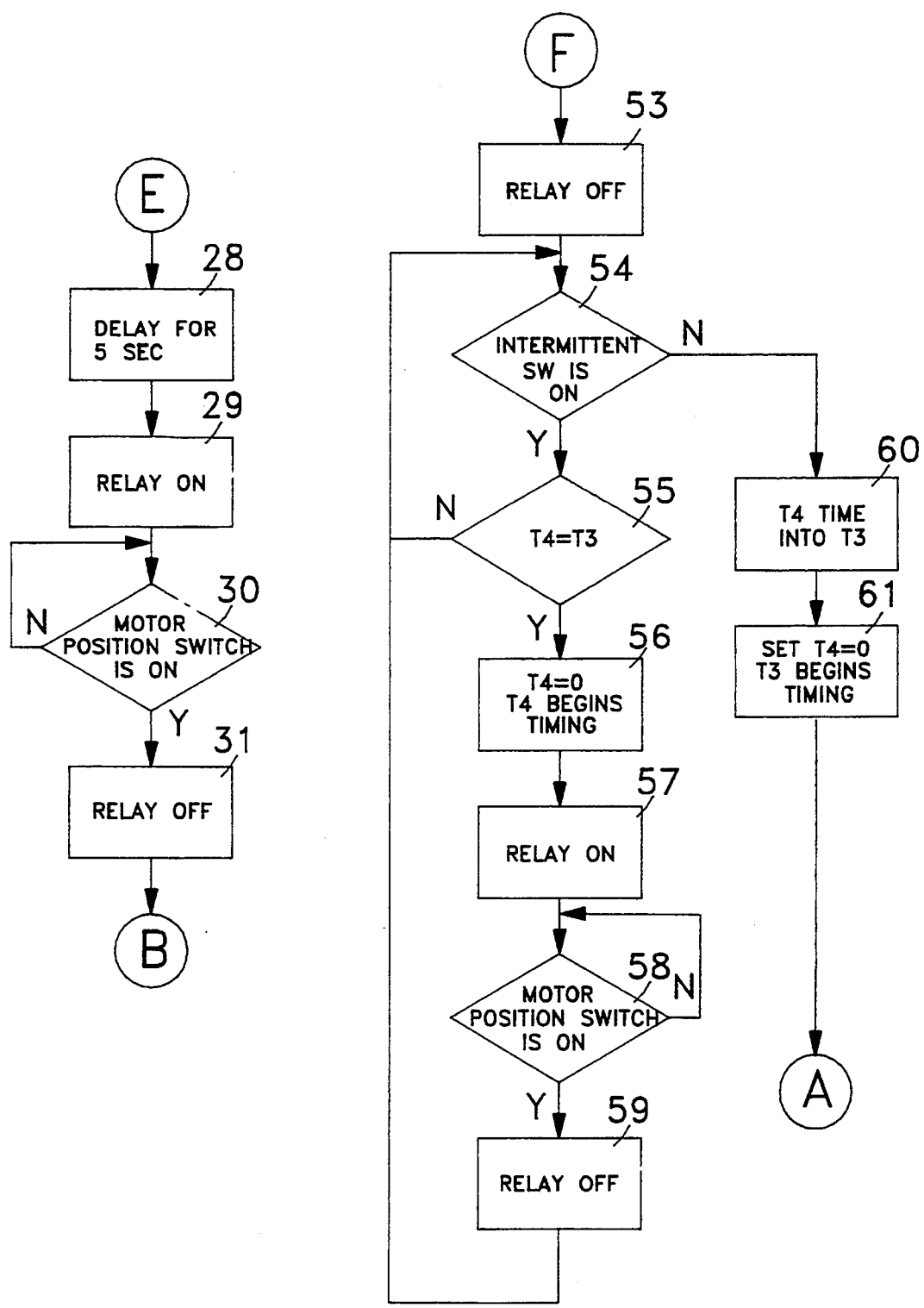

Please refer to the flow charts in FIGS. 3A, 3B, and 3C, wherein 10 is the starting point; 11 determines whether the water jet switch in on; 12 sets T1=0 and begins timing; 13 determines whether the water jet switch is on; 14 determines whether T1 is greater than 2 seconds; 15 is a relay to activate the wiper; 16 determines whether the water jet switch is on; 17 stops timing of T1; 18 determines whether the motor position signal switch is on; 19 determines whether T1 is greater than 1.9 seconds; 20 determines whether T1 is greater than 0.5 second; 21 sets a counter CNT1=1; 22 sets another counter CNT1=2; 23 determines whether the motor position signal switch is on; 24 determines whether the motor position signal switch is on; 25 determines whether CNT1−1=0; 26 sets the relay off; 27 determines whether the motor position signal switch is on; 28 delays for 5 seconds; 29 sets the relay on; 30 determines whether the motor position signal switch is on; 31 sets the relay off; 32 determines whether the intermittent switch of the wiper is on, (i.e. determines whether the switch of the wiper is set on the intermittent mode); 33 sets T2, T3, T4=0 and T3 begins timing; 34 determines whether the intermittent switch of the wiper is on; 35 determines whether T3 is greater than 0.3 second; 36 sets the relay on; 37 determines whether the motor position signal switch is on; 38 sets the relay off; 39 determines whether the motor position signal switch is on; 40 determines whether the intermittent switch of the wiper is on; 41 sets T3=0; 42 sets the relay on; 43 determines whether the intermittent switch of the wiper is on; 44 sets the relay off; 45 sets T3 to begin timing; 46 determines whether T3 is greater than 600 seconds; 47 sets T2=0 and start timing; 48 determines whether the intermittent switch of the wiper is on; 49 determines whether T2 is greater than 0.3 second; 50 stops the timing of T3 and sets T4 to begin timing; 51 sets the relay on; 52 determines whether the motor position signal switch is off; 53 sets the relay off; 54 determines whether the intermittent switch of the wiper is on; 55 determines whether T3 is equal to T4; 56 sets T4=0 and T4 begins timing; 57 sets the relay on; 58 determines whether the motor position signal switch is on; 59 sets the relay off; 60 loads T4 time into T3; and 61 sets T4=0 and T3 begins timing.

Referring to FIG. 4, the computer-aided self-learning intermittent wiper controller comprises (1) a power circuit 1, also a voltage regulator, which is composed of IC1 and C1 to filter out noise;

(2) an input photo coupled circuit 2, wherein PH1, R3, and R4 couple signals of the motor position signal switch E; PH2, R2, and R5 couple signals of the water jet switch D; and wherein PH3, R1, and R6 couple signals of the intermittent switch D of the wiper;

(3) a reset circuit 3 which will generate a reset signal when the voltage detected by Q1, R7, R8, and R9 is lower than 4.5 V;

(4) a microprocessing circuit 4 composed of a single chip microcomputer IC2 containing RAM, ROM, and I/O port, wherein PB0, PB1, and PB2 are inputs, PA0 is an output; wherein R11, R12, C4, C5, and XL constitute the clock signals of OSC1 and OSC2; and wherein R10, C2, and C3 remove noises: and (5) a driving circuit 5, whose output is amplified by RB, Q2, R14, and Q3 to drive the relay RL and to give a control signal through F. D1 is used to remove pulses. The power circuit regulates the voltage of A and B to a working voltage of 5 V. The inputs PB0, PB1, and PB2 of the microcomputer processing circuit loads the signals of the motor position switch at E, the water jet switch at D, and the intermittent switch at C into IC2 through the photo coupled circuit. The signals are processed by a software, the output signal from PA0 passes the driving circuit, comes out of the point F, and works repeatedly until a new input signals enter the points C, D, and E.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A computer-aided self-learning intermittent wiper controller comprising:

a wiper means for sweeping a windshield;

a wiper switch means for selecting the operation of said wiper means, said wiper switch means having a four-position selection switch, including a high speed, a low speed, an intermittent, and an off positions;

a motor means for driving said wiper means;

a driving circuit means for driving said motor means;

a water jet switch means for activating a windshield wash;

a microprocessor means for receiving an intermittent position signal responsive to said wiper switch means in said intermittent position, for receiving a motor cam position signal responsive to a windshield wiper motor cam in a home position, for receiving a water jet switch signal responsive to the activation of said water jet switch means, for generating a signal representative of whether said wiper switch means has been manually activated, and for supplying signals to said driving circuit means;

wherein said microprocessor means measures and memorizes a time interval between a first time said wiper switch means has been manually activated and a second time said wiper switch means has been manually activated, and causes said wiper means to intermittently sweep said windshield at said memorized time interval until said wiper switch means is turned off to reset a different time interval, or turned off and manually reactivated before the expiration of said memorized time interval, at which time, a new time interval is memorized, the new time interval equals the time between the last sweep of said wiper means and the latest activation of said wiper switch means;

said microprocessor means receives said water jet switch signal indicating said water jet switch means has been activated, and causes said wiper means to sweep said windshield continuously until said water jet switch means is released, after that, causes said wiper means to sweep said windshield continuously for a predetermined time period, stop for a next predetermined time period, and sweep once after the next predetermined time period.

\* \* \* \* \*